Jan. 14, 1930.  E. J. COTTER  1,743,323
EXPANSIBLE PISTON
Filed July 17, 1928
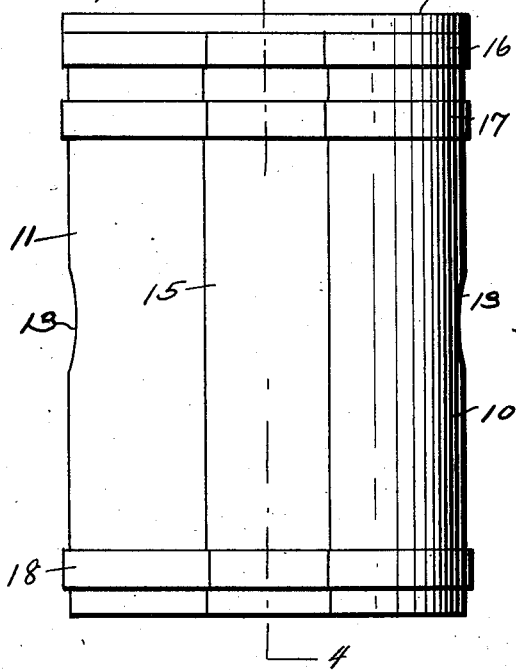
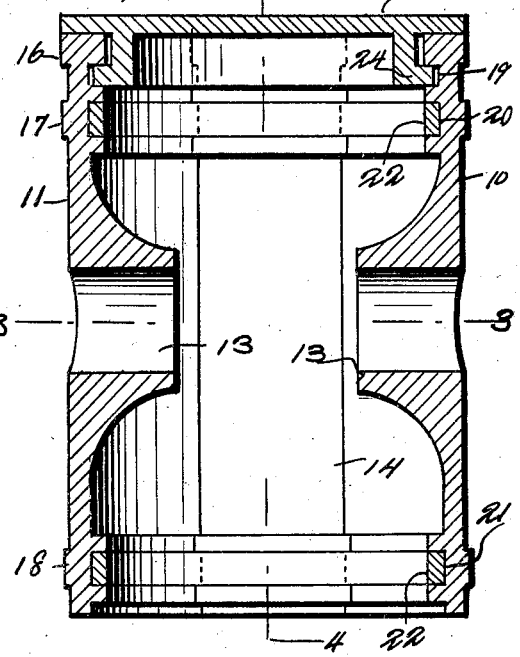
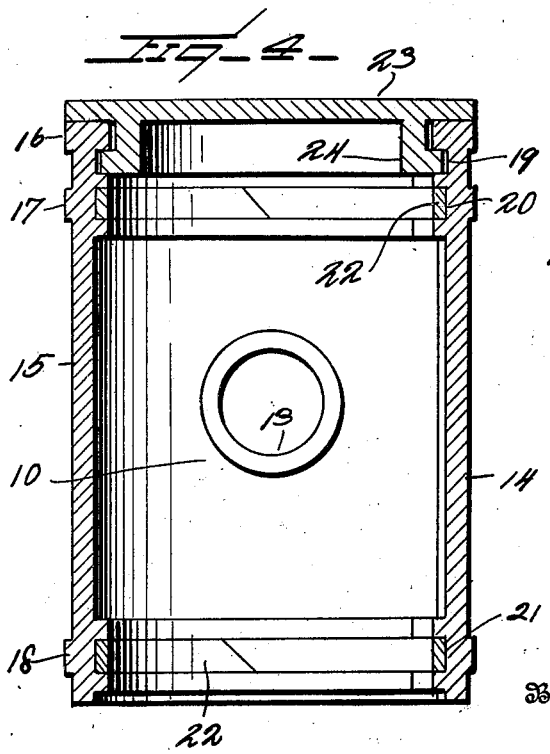
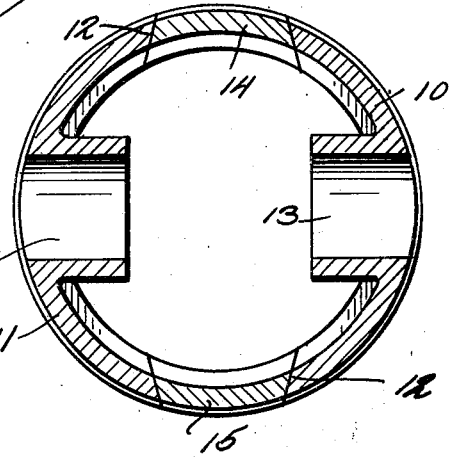
Inventor
E. J. Cotter
By Watson E. Coleman
Attorney Patented Jan. 14, 1930

1,743,323

UNITED STATES PATENT OFFICE

EDWARD JAMES COTTER, OF HANNIBAL, MISSOURI

EXPANSIBLE PISTON

Application filed July 17, 1928. Serial No. 293,455.

This invention relates to pistons particularly designed for internal combustion engines, though not limited to that use, which are capable of being expanded circumferentially or contracted in the same manner so as to cause the piston to fit the cylinder without the necessity of using piston rings.

The general object of the present invention is to provide a very simple piston of this character in which the walls of the piston are formed of sections, two of the sections being wedge-shaped and in which springs are used for urging said wedge-shaped sections outward to thus continuously exert an expansive thrust upon the piston.

A further object is to provide a piston of this character with a head which will permit of this expansion and contraction and which is made separate from the body of the piston.

A still further object is to so construct the piston that piston rings are not necessary.

My invention is illustrated in the accompanying drawings wherein—

Figure 1 is a side elevation of a piston constructed in accordance with my invention;

Fig. 2 is a vertical sectional view thereof;

Fig. 3 is a section on the line 3—3 of Fig. 2 and

Fig. 4 is a section on the line 4—4 of Fig. 2.

Referring to these drawings, it will be seen that the piston consists of two oppositely disposed sections 10 and 11, each of these sections being arcuate in cross section and each of these sections at its ends being outwardly beveled as at 12. Each of these sections carries upon it the bearing 13 for the wrist pin of the connecting rod. Coacting with the sections 10 and 11 are the two opposed relatively narrow sections 14 and 15; these sections being duplicates. The beveled ends 12 of the opposed sections 10 and 11 are outwardly convergent and the sections 14 and 15 have complementary beveled edges which fit against the beveled edges 12. When these sections 14 and 15 are in place they form continuations of the piston wall. The exterior of the piston, constructed as above described, is formed with the lands 16 and 17 at the head of the piston and the land 18 at the end opposite the head. The head of the piston on the inside is formed with a circumferential groove 19, which groove is, of course, present in all of the sections and below this groove 19 is a circumferential groove 20 and at the opposite end of the piston with a circumferential groove 21. Disposed within the grooves 20 and 21 are the expansible springs 22 which exert a constant outward pressure upon the sections of the piston.

The piston head 23 has a diameter equal to the normal diameter of the piston and extending into the interior of the piston is an angular annular flange 24, this flange projecting into the groove 19 and thus interlocking the head of the piston with the body of the piston but permitting the sections of the body to be expanded under the action of the springs 22, or contracted.

It will be seen that this piston is very simple in construction, the piston has no packing rings as the lands 16, 17 and 18 constitute wearing portions; these lands projecting about 1/64 of an inch beyond the face of the piston body. The piston will quickly adjust itself to the cylinder and the lands will keep the piston gastight at all times. This improved piston can be fitted to any new or worn cylinder and overcome "piston flap". This piston cannot freeze to the walls of the cylinder and all danger of scouring the cylinder is eliminated.

In constructing this piston the piston body is cast or otherwise formed and then cut away on the lines 12 so as to leave the two sections 10 and 11. The wedges or wedge sections 14 and 15 are made from a similar casting but with the wrist pin bosses 13 left out, thus several wedges may be made from one casting, cutting down the cost of construction. As before remarked, the head is made separate from the piston and with the spring rings and wrist pin not only makes the device complete but cuts down the cost of construction.

What I claim is—

1. An expansible piston formed of two opposed lateral sections, each having a wrist pin boss, the sections having convergently inclined edge faces, intermediate wedge-shaped sections having complementary inclined edge faces and disposed between the edge faces of the first named sections, interior annular springs bearing against all of said sections and urging them outward, and a detachable head having interlocking engagement with the sections.

2. An expansible piston formed of two opposed lateral sections, each having a wrist pin boss, the sections having convergently inclined edge faces, intermediate wedge-shaped sections having inclined edge faces and disposed between the edge faces of the first named sections, and interior annular springs bearing against all of said sections and urging them outward, all of said sections on their faces being formed to provide a circumferential groove, and a head having a circular annular flange depending from the inner face of the head and engaging in said groove.

3. A piston of the character described formed of two opposed sections each arcuate in cross section and each formed with a wrist pin boss and two opposed intermediate sections, the edge faces of the intermediate sections and of the first named sections being beveled so that the intermediate sections will urge the first named sections outward when the intermediate sections are forced outward, a head detachably engaged with all of said sections and permitting outward movement of the sections, and spring rings disposed at the top and bottom of the piston and expanding against the walls thereof to urge the sections outward.

4. An expansible piston formed of two main opposed sections, each of these main sections being arcuate in cross section and having a wrist pin boss, opposed intermediate wedge-shaped sections, the intermediate sections and the main sections having their side edges beveled to cause the intermediate sections to wedge the main sections outward when the intermediate sections are forced outward, the main and intermediate sections being formed adjacent opposite ends of the piston with circumferential interior grooves and the said sections at their head ends being formed with an interior circumferential groove, spring rings disposed within the first named grooves and a piston head having an annular flange depending from its inner face, the flange being angular in cross section to provide an outwardly projecting portion to engage in these second named grooves.

In testimony whereof I hereunto affix my signature.

EDWARD JAMES COTTER.